(12) United States Patent
Dick

(10) Patent No.: US 10,732,016 B1
(45) Date of Patent: Aug. 4, 2020

(54) WATER METER TRANSMITTER HOUSING

(71) Applicant: Norgas Metering Technologies, Inc., Fairfield, OH (US)

(72) Inventor: Michael D. Dick, Springboro, OH (US)

(73) Assignee: Norgas Metering Technologies, Inc., Fairfield, OH (US)

( * ) Notice: Subject to any disclaimer, the term of this patent is extended or adjusted under 35 U.S.C. 154(b) by 1197 days.

(21) Appl. No.: 14/309,778

(22) Filed: Jun. 19, 2014

Related U.S. Application Data

(60) Provisional application No. 61/837,140, filed on Jun. 19, 2013.

(51) Int. Cl.
*G01F 1/58* (2006.01)
*G01D 4/00* (2006.01)
*H04Q 9/00* (2006.01)

(52) U.S. Cl.
CPC ............... *G01F 1/58* (2013.01); *G01D 4/008* (2013.01); *H04Q 9/00* (2013.01); *H04Q 2209/00* (2013.01); *H04Q 2209/40* (2013.01); *H04Q 2209/60* (2013.01); *H04Q 2209/80* (2013.01)

(58) Field of Classification Search
CPC .................. G01D 4/002; G01D 4/008; H04B 2203/5433; G01R 22/063; H04Q 2209/60; H04Q 2209/00; H04Q 2209/40; H04Q 2209/80; H04Q 9/00; G01F 1/58
USPC ........................................ 340/870.01, 870.02
See application file for complete search history.

(56) References Cited

U.S. PATENT DOCUMENTS

| | | | |
|---|---|---|---|
| 2008/0218164 A1* | 9/2008 | Sanderford | G01D 4/008 324/260 |
| 2009/0153357 A1* | 6/2009 | Bushman | G01D 4/008 340/870.02 |

OTHER PUBLICATIONS

Inovonics; EN 1501-EXT Pulse Counting Transmitter for Integration-Installation and Operation Manual—06289C; 2011, 4 pages.

* cited by examiner

*Primary Examiner* — Franklin D Balseca
(74) *Attorney, Agent, or Firm* — Wood Herron & Evans LLP

(57) ABSTRACT

A submetering meter housing is sized and shaped to receive and mount a transmitter circuit board in an integrated fashion to the meter to provide electronic meter monitoring of the submetering meter. The submetering meter housing includes a switch circuit board with a counter reed switch that is connected to the count input of the transmitter circuit board, and positioned to open and close in response to the rotation of a permanent magnet included within the meter, and a tamper reed switch that is connected to the tamper input of the transmitter circuit board, and positioned to close in response to the presence of a permanent magnet included in the meter lens, so that disassembly of the submetering meter which separates the tamper reed switch from the meter lens causes a tamper signal to be transmitted by the transmitter circuit board.

4 Claims, 5 Drawing Sheets

WATER METER TRANSMITTER HOUSING

CROSS-REFERENCE TO RELATED APPLICATIONS

The present application claims priority to U.S. Provisional Application Ser. No. 61/837,140 filed Jun. 19, 2013, and is related to U.S. Design Patent Application Serial No. 29/458,436 filed Jun. 19, 2013, by the inventor herein and entitled WATER METER TRANSMITTER HOUSING, which are hereby incorporated by reference herein in its entirety.

FIELD OF THE INVENTION

The present invention relates to submetering of water consumption, and the use of electrical meter reading technology in that application.

BACKGROUND OF THE INVENTION

Multi-family property owners and condominium associations often face substantial costs for consumption of water and electricity by tenants or unit owners, and seek to control that cost by allocating the cost of the consumption to individual tenants or owners according to their individual use.

Unfortunately, determining consumption of energy and water is difficult. Although a consumer or business may receive a general bill for services once a month from a utility, the bill does not typically indicate how or when the energy or natural resource was consumed by individual users. Further, consumers and businesses are typically unaware of the specific activities of tenants or unit owners that consume energy and natural resource consumption. To resolve this issue owners or managers typically install submetering meters between the water or electrical supply and each individual unit, so that individual consumption can be monitored and billed appropriately.

Unfortunately, the manual reading of submeters can be an arduous task, particularly if the submeters are installed in an inconvenient location or are difficult to read as installed.

To facilitate meter reading, "smart meters" have been introduced; these accumulate a count of consumption through the meter and report that count electronically, typically through a radio frequency wireless transmission to a collecting site. However, these meters are typically intended for entire buildings and not individual rental or condominium units. To date, there have been few products that attempt to provide smart meter functionality to "submetering" applications. These products are typically a completely proprietary solution, integrating a transmitter of custom design into the housing of a submeter. Because these devices are proprietary and involve a custom electronics design, they have been expensive and have not been widely adopted.

One alternative solution which has been used by the present applicant, is to adopt a standard transmitter electronics board, such as the Innovonics EN1501-EXT "Pulse Counting Transmitter for Integration", for use with a submetering meter. For this application, the applicant has sold the EN1501-EXT, along with an external plastic housing for holding the EN1501-EXT, and a clip having zip ties. The installer installs a battery in the EN1501-EXT to power its transmitter, pairs the transmitter to a controller, and then places the clip in the housing and uses the clip to strap the housing to the submetering meter or a nearby pipe. Wires are then run from the connectors on the EN1501-EXT board to connections inside the meter.

A disadvantage to the solution just described is that it is cumbersome to install, involves multiple parts, and requires the use of zip ties and wiring inside of the metering closet. The presence of zip tied parts and wires in particular makes the installation potentially subject to vandalism; the meter may be disconnected from the transmitter simply by clipping a wire that is external to the meter and transmitter housing, and further, the transmitter itself may be cut from the housing and removed. Although the EN1501-EXT includes a "tamper detection" feature, which immediately notifies a central controller in the case of a tampering event, this feature uses an on-board switch that only detects the opening of the housing; it does not detect, for example, cutting of the wires connecting the EN1501-EXT board to the meter, nor does it detect the removal of the EN1501-EXT along with its housing as a unit.

Accordingly, there is a need for a meter usable for submetering applications that incorporates a smart meter/electronic reading functionality, which does not require the use of proprietary or expensive parts and thus is more widely adoptable in cost-sensitive applications. Furthermore, there is a need for a meter incorporating a smart meter/electronic reading functionality which is not subject to tampering by the cutting of external wires, and which provides tamper detection functions which more meaningfully protect the electronic system from vandalism than is accomplished in the installations described in the previous paragraph.

SUMMARY OF THE INVENTION

The present invention provides a redesigned submetering meter housing that is sized and shaped to receive a transmitter circuit board such as the EN1501-EXT and couple that board in an integrated fashion to the meter to accomplish the stated objects.

Specifically, the submetering meter housing includes a switch circuit board with a counter reed switch that is connected to the count input of the transmitter circuit board, and positioned to open and close in response to the rotation of a permanent magnet included within the meter.

The submetering meter housing switch circuit board further includes a tamper reed switch that is connected to the tamper input of the transmitter circuit board, and positioned to close in response to the presence of a permanent magnet included in the meter lens, so that disassembly of the submetering meter which separates the tamper reed switch from the meter lens causes a tamper signal to be transmitted by the transmitter circuit board.

The above and other objects and advantages of the present invention shall be made apparent from the accompanying drawings and the description thereof.

BRIEF DESCRIPTION OF THE DRAWINGS

FIG. 2 is a reverse perspective view of the water meter with transmitter housing shown in

FIG. 1;

The accompanying drawings, which are incorporated in and constitute a part of this specification, illustrate embodiments of the invention and, together with a general description of the invention given above, and the detailed description of the embodiments given below, serve to explain the principles of the invention.

DETAILED DESCRIPTION OF THE INVENTION

Figure 1:
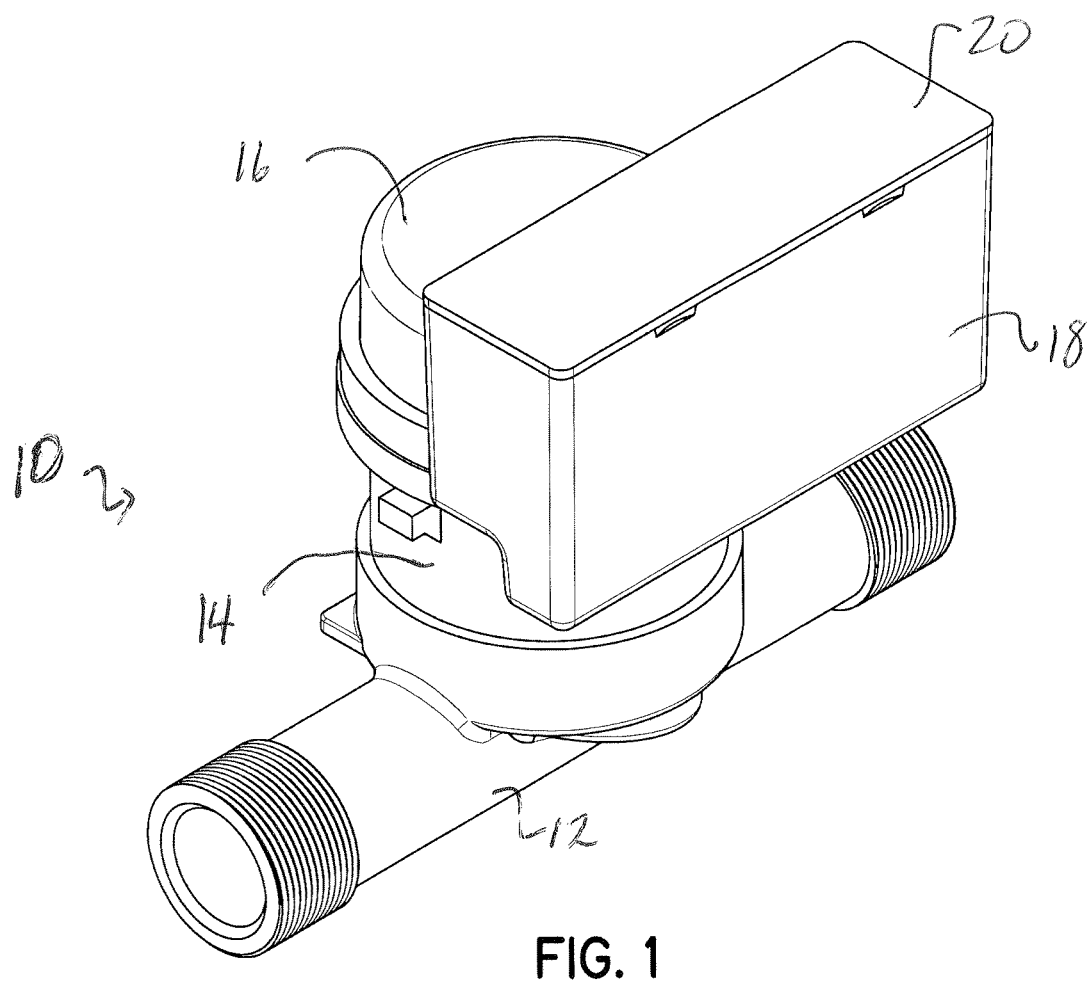
FIG. 1 is a perspective view of a water meter incorporating a housing for a transmitter circuit board.
Figure 2:
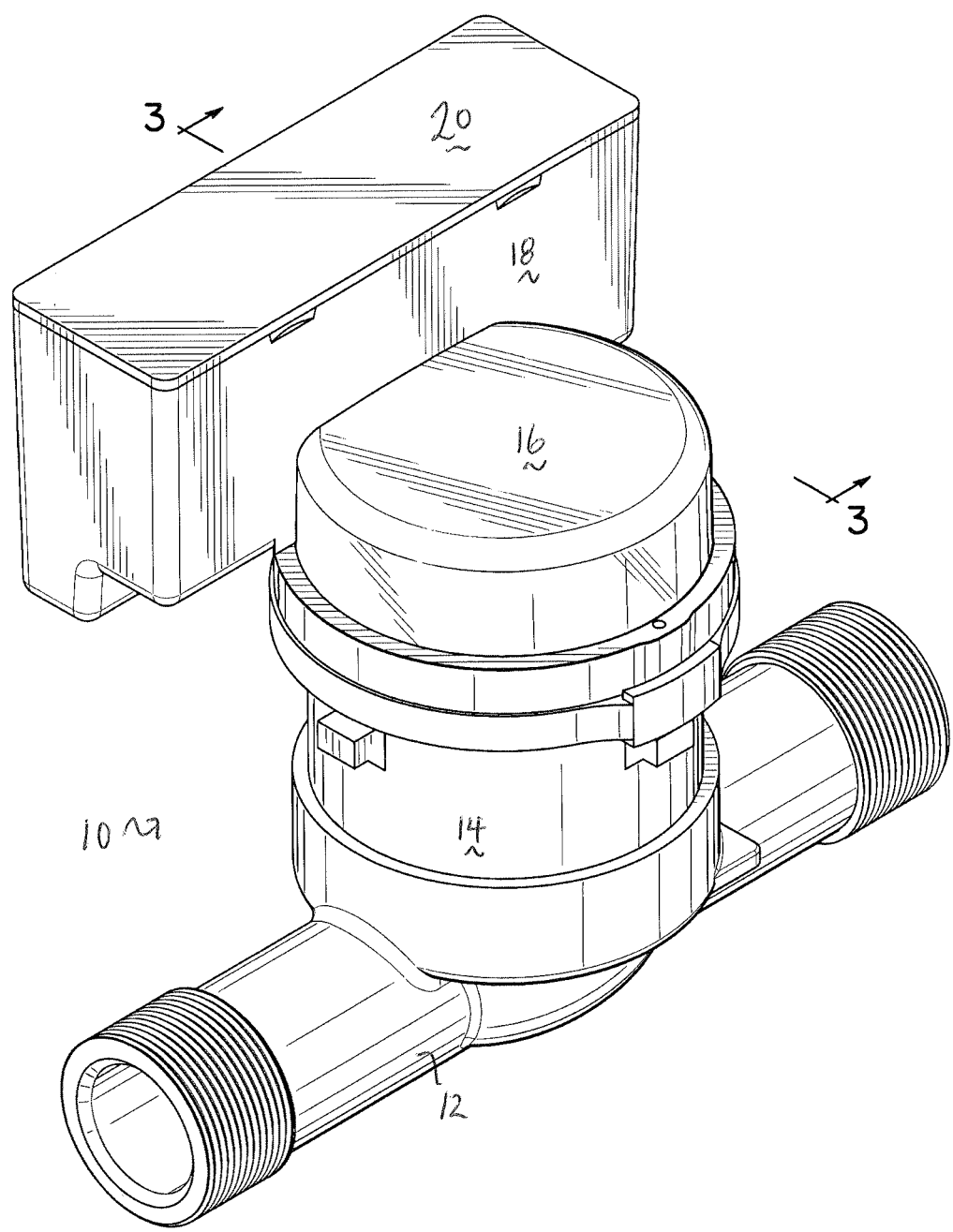

As seen in FIGS. 1 and 2, a water meter 10 in accordance with principles of the present invention measures water flow through pipe section 12. A housing 14 holds a metering apparatus of a type which is conventionally known, which drives mechanical dials within a clear housing lens 16 to create a visual indication of the meter reading.

The meter of FIGS. 1 and 2 further includes an integral transmitter housing 18, which is open at the top to permit the installation of a transmitter and switch circuit board as is described in detail below. A snap fit lens 20 encloses the circuit boards within the housing 18.

Figure 3A:
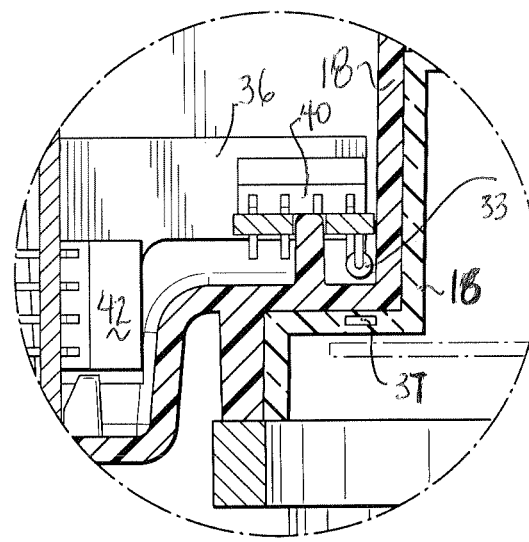
FIG. 3A is a detail view of FIG. 3 showing the position of the tamper detection reed switch and magnet.
Figure 3:
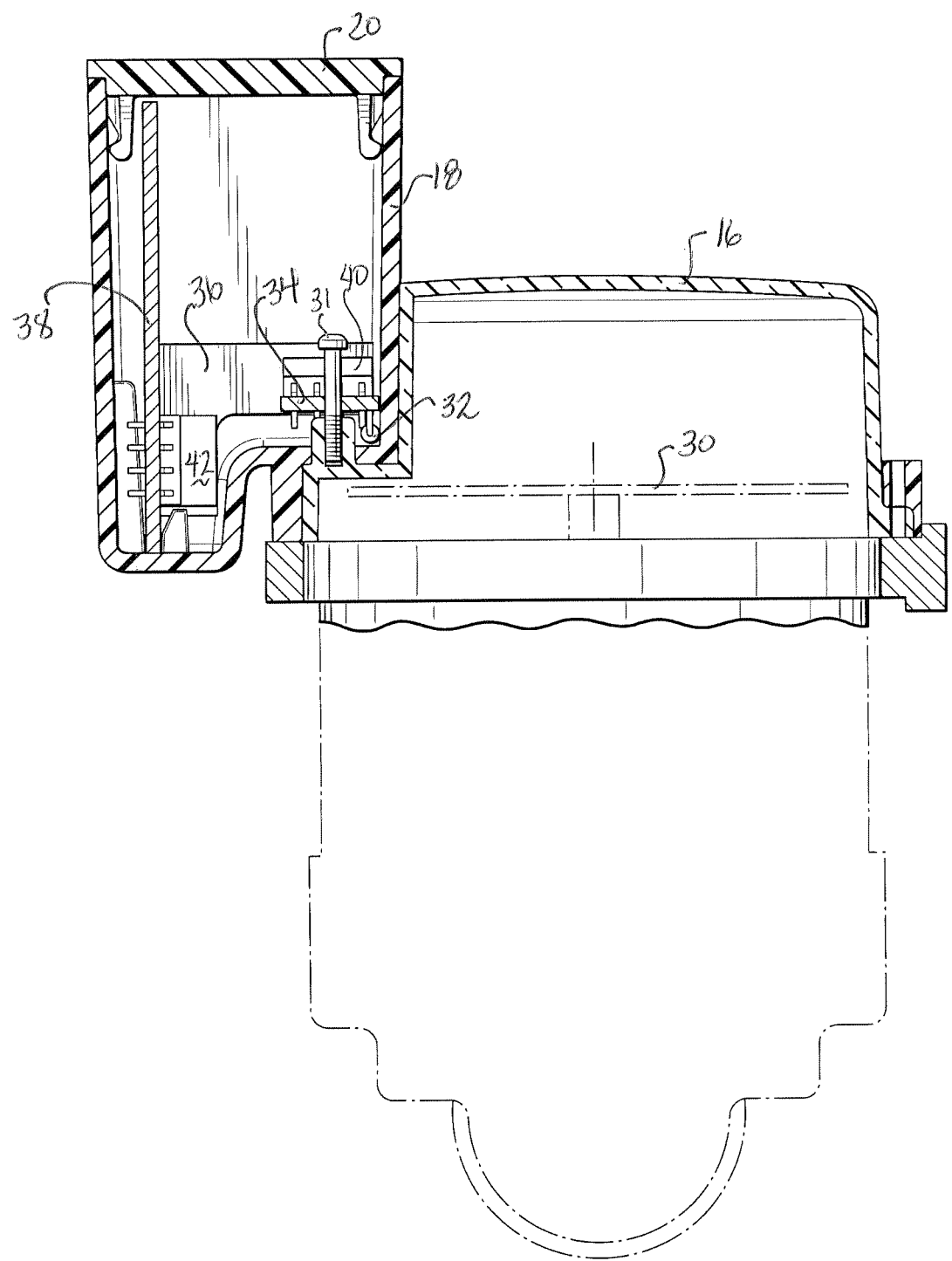
FIG. 3 is a cross-sectional view of the water meter of FIGS. 1 and 2 taken along lines 3-3 in FIG. 2.

As seen in FIG. 3, the circuitry inside of the housing 18 includes elements which detect rotations of a dial 30 inside of the meter lens 16 indicative of water flow, which are held in place by a mounting screw 31. Specifically, a reed switch 32 on switch circuit board 34 extends downward in housing 18 to a position near to where a permanent magnet on dial 30 passes, such that each pass of the permanent magnet creates a switch closure of the reed switch 32. The terminals of reed switch 32 are connected through a connection board 36 to a transmitter board 38, via connectors 40 and 42. Closure of the reed switch 32 terminals causes the transmitter board 38 to transmit a meter count. Notably no external wiring is required to deliver counts from the meter to the transmitter board.

Transmitter board is a mass manufactured transmitter module such as the above-noted Innovonics EN1501-EXT, or a similar module from another manufacturer. The EN1501-EXT includes a four pin connector having ground, power, count and tamper pins. A connection between count and ground is transmitted as a meter count by the transmitter. An open circuit between tamper and ground causes transmission of a tamper alarm by the transmitter.

FIG. 3A illustrates the tamper reed switch 33 which is positioned on the switch circuit board in a location which is adjacent to a permanent magnet 37 embedded in the lens 16, to detect the presence of the magnet 37 or, in the absence thereof, create an open circuit between the tamper and ground pins on the EN1501-EXT which will create a tamper alert. Accordingly, disassembly of the meter or removal of the electronics of the switch board or only the transmitter board from the housing 18 will create a tamper alarm.

Figure 4:
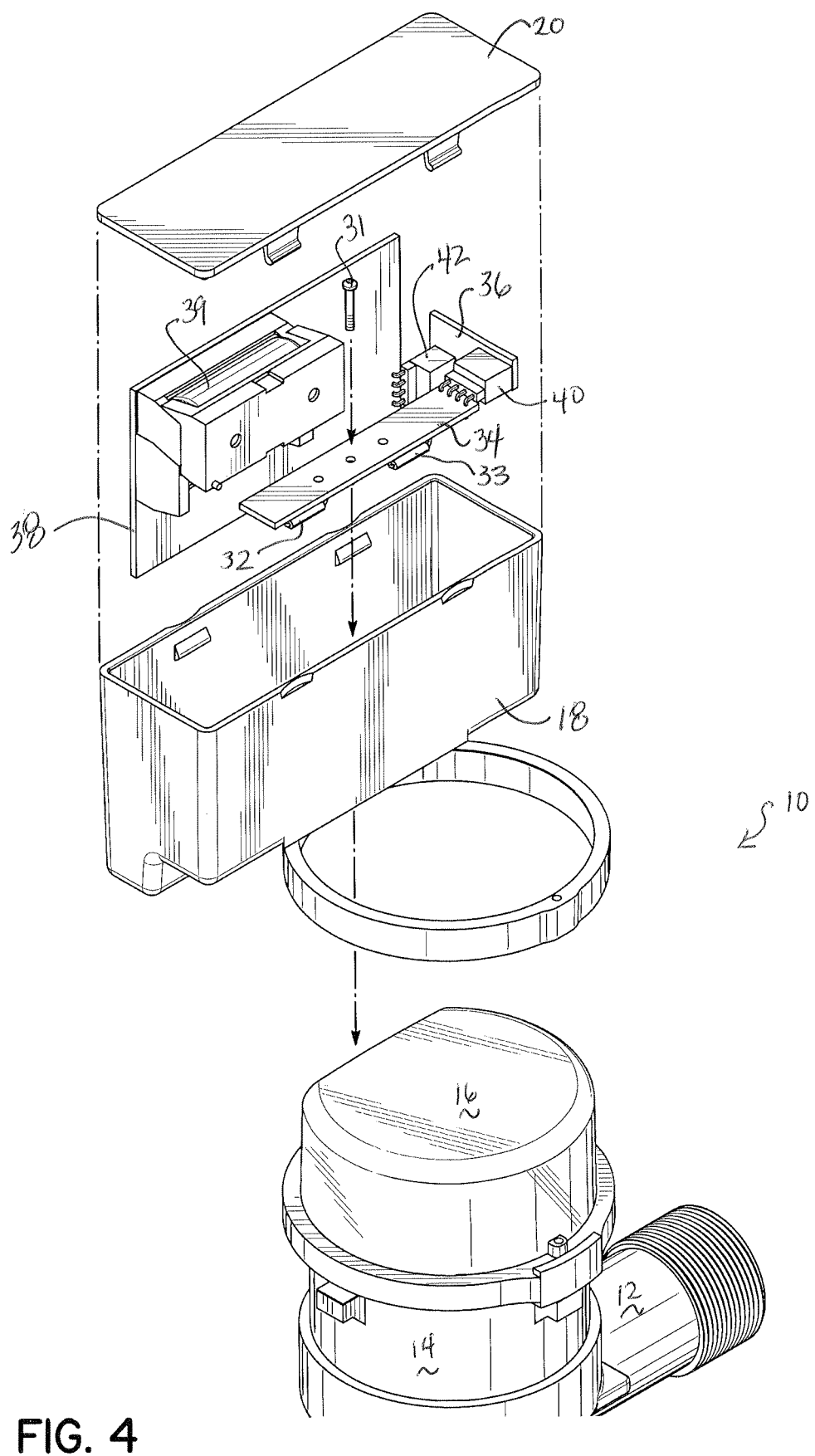
FIG. 4 is a disassembled perspective of the water meter of FIG. 2 showing the transmitter circuit board and switch circuit board as they are connected to each other inside of the transmitter housing.
Figure 5:
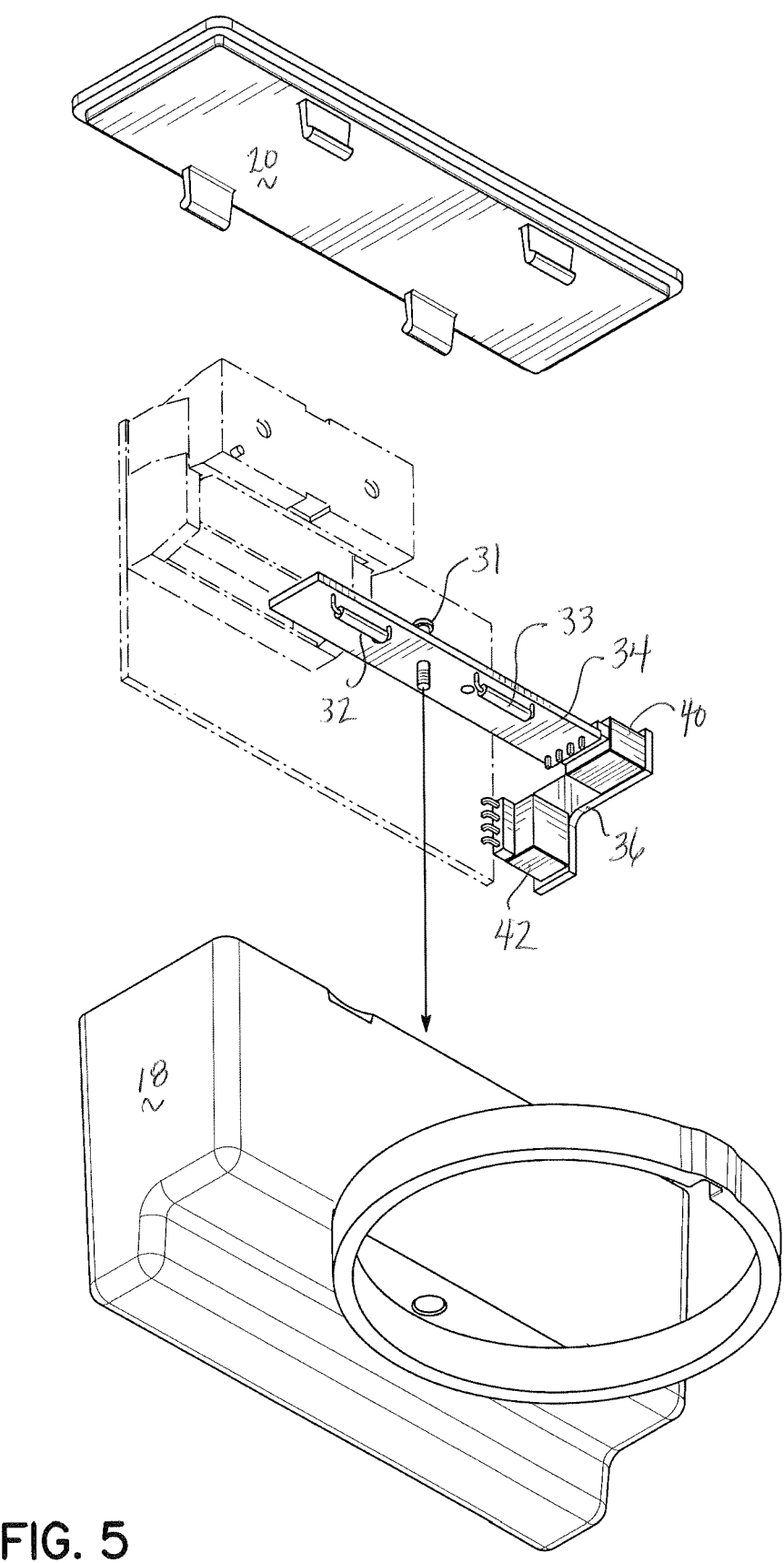
FIG. 5 is a reverse disassembled perspective view showing the underside of the switch circuit board and the positions of the count and tamper detection reed switches.

FIGS. 4 and 5 show the transmitter board 38 and switch board 34, clarifying the relative positions of the count switch 32 and tamper switch 33 described in the previous Figures. FIG. 4 also shows the relative location of the battery compartment 39 of the transmitter board, which is omitted from the preceding Figures for clarity. The transmitter board 38 further typically includes an on-board antenna. (The EN1501-EXT further includes a reset switch and tamper switch which are not normally used in the present application and not shown in the Figures.)

While the present invention has been illustrated by a description of various embodiments and while these embodiments have been described in considerable detail, it is not the intention of the applicants to restrict or in any way limit the scope of the appended claims to such detail. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit or scope of applicant's general inventive concept.

What is claimed is:

1. A meter comprising:
   a. a housing comprising an installer accessible housing portion sized and shaped to receive a transmitter circuit board and a sensor circuit board and couple the transmitter and sensor circuit boards in an integrated fashion to the meter, the transmitter and sensor circuit boards having generally planar surfaces which are approximately perpendicular to each other, the sensor circuit board having a magnetic sensor mounted thereto,
   b. a register located within the housing, the register responding to flow through the meter to rotate a dial, the dial having a magnetic source mounted thereto and rotating the magnetic source in a plane,
      wherein the sensor circuit board and rotating magnetic source are positioned by the housing so that, during rotation of the dial, the magnetic source will produce an electromagnetic signal delivered into the installer accessible housing portion, so as to trigger the magnetic sensor mounted to the sensor circuit board located therein to count flow through the meter.

2. The meter of claim 1 wherein the transmitter circuit board includes a signal transmitter and a count input, wherein the magnetic sensor mounted to the sensor circuit board comprises a reed switch, the reed switch connected to the count input of the transmitter circuit board, and positioned to open and close in response to the rotation of a permanent magnet on the dial included within the meter generating the electromagnetic signal.

3. The meter of claim 2 further comprising
   a. a meter lens, the meter lens incorporating therein a second magnetic source,
   b. a second magnetic sensor positioned relative to the meter lens so that the second magnetic sensor responds to a presence of the second magnetic source included in the meter lens and thereby generates a tamper signal, the transmitter circuit board including a tamper input connected to the second magnetic sensor to receive the tamper signal.

4. The meter of claim 1 further comprising
   a. a meter lens, the meter lens incorporating therein a second magnetic source,
   b. a second magnetic sensor positioned relative to the meter lens so that the second magnetic sensor responds to a presence of the second magnetic source included in the meter lens and generates an electromagnetic signal.

* * * * *